United States Patent
Traughber et al.

(12) 
(10) Patent No.: US 6,256,678 B1
(45) Date of Patent: Jul. 3, 2001

(54) OBJECT ORIENTED METHOD AND SYSTEM FOR PROVIDING A COMMON COMMUNICATIONS INTERFACE BETWEEN SOFTWARE APPLICATION PROGRAMS

(75) Inventors: Thomas J. Traughber, Lucas; Brigitte B. Birze, Plano; Delmar G. Hager, Austin, all of TX (US)

(73) Assignee: Sterling Software, Inc., Dallas, TX (US)

( * ) Notice: Subject to any disclaimer, the term of this patent is extended or adjusted under 35 U.S.C. 154(b) by 0 days.

(21) Appl. No.: 08/783,524

(22) Filed: Jan. 14, 1997

Related U.S. Application Data

(63) Continuation of application No. 08/341,238, filed on Nov. 17, 1994, now abandoned.

(51) Int. Cl.$^7$ ................................. G06F 9/00; G06F 9/46
(52) U.S. Cl. ........................... 709/310; 709/315; 709/320
(58) Field of Search ................................... 709/300, 301, 709/303, 203, 310, 311, 312, 315, 320, 328; 370/200

(56) References Cited

U.S. PATENT DOCUMENTS

| | | | | |
|---|---|---|---|---|
| 5,073,890 | * | 12/1991 | Danielsen ............................. | 370/270 |
| 5,454,109 | * | 9/1995 | Bruynooghe et al. ............... | 395/701 |

OTHER PUBLICATIONS

Stevens, UNIX Network Programming, Prentice Hall, p. 19, 153, 204, 212, 267–272, 339, Dec. 1990.*

M. Pendergast, "Design and Evaluation of A Distributed Object–Oriented Communication System for EMS Application Development", Proceedings of the 10th Annual International Phoenix Conference on Computers and Communications, Mar. 1991, Arizona, pp. 309–315.

D. Schmidt, "Systems Programming with C++ Wrappers", C++ Report, vol. 4, No. 8, Oct. 1992, USA, pp. 50–54.

D. Schmidt, "A C++ Wrapper for UNIX I/O Multiplexing", C++ Report, vol. 5, No. 7, Sep. 1993, USA, pp. 32, 37–43.

Hall, et al., "Window Sockets—An Open Interface for Network Programming under Microsoft® Windows™", Version 1.1, Jan. 20, 1993, pp. 1–130.

Hall, Martin, "A Guide to Window Sockets", Jun. 1993, pp. 1–17.

* cited by examiner

*Primary Examiner*—Zarni Maung
(74) *Attorney, Agent, or Firm*—Baker Botts L.L.P.

(57) ABSTRACT

The present invention is a method and system for providing a common communications interface between a plurality of programs through a communications network. The system includes an adapter object (2b) responsive to a first one of the plurality of programs for connecting to the communications network; a resource object (2c) coupled to the adaptor object (2b) and also associated with the first one of the plurality of programs for storing at least one identifier associated with the first one of the plurality of programs in the memory of the computer and responsive to an agent object (2d) associated with a second one of the plurality of programs for generating a view object (2e) for accepting communications through said communications network; and a data object (2f) coupled to the agent object (2d) and to the view object (2e) for storing the data transmitted between the plurality of programs.

20 Claims, 12 Drawing Sheets

OBJECT ORIENTED METHOD AND SYSTEM FOR PROVIDING A COMMON COMMUNICATIONS INTERFACE BETWEEN SOFTWARE APPLICATION PROGRAMS

This application is a Continuation of application Ser. No. 08/341,238 filed on Nov. 17, 1994, now abandoned.

TECHNICAL FIELD OF THE INVENTION

The present invention relates to an object oriented method and system for providing a common communications interface between software application programs.

BACKGROUND OF THE INVENTION

Communication between software applications and the programs which comprise the applications is an important issue in any computer system. One method of providing for such communications is through an application program interface (API). Several different API's are available for facilitating communication between application programs including Berkeley Sockets, IBM's CPI-C, Microsoft's NetBEUI, WinSock and PeerLogic's PIPES Platform™.

For general reference see Comer, Douglas E and Stevens, David L., *Internetworking with TCP/IP*, vol. III, Prentice-Hall, (1993); *PIPES Platform User's Guide and Reference MaNual*, PeerLogic, Inc., (1993); "X/Open Transport Interface (XTI)", X/Open CAE Specification, X/Open Company Limited, (1992); Stevens, W. Richard, *Unix Network Programming*, Prentice-Hall, (1990); *Common Programming Interface Communications Reference*, Fourth Edition, IBM, (1991); Schmidt, Douglas, "Concurrent O-O Network Programming With C++", C++ World, 1994; and Bach, Maurice J., *The Design of the Unix Operating System*, Prentice-Hall, (1986).

Each of the API's, however, has advantages and disadvantages which make it a better or worse choice than using another of the API's under similar circumstances. And, in many cases, it may be necessary for one application to use more than one of the API's because two or more applications with which it needs to communicate are using different ones of the API's available.

Thus, programming an application to use only one of the API's means that the application will not operate at peak performance under some circumstances. However, reprogramming the application to use a different API when circumstances change can become time consuming and increases the opportunity to introduce errors into the application because of the operational nuances of each API. Thus, it is desirable to have a common API which can be used to communicate with a variety of other API's.

Furthermore, as more efficient and/or more flexible API's become available, the desire to use the new API to take advantage of the latest features or to remedy past problems will sometimes necessitate a conversion. It is desirable to do such a conversion with minimum, if any, impact to the application.

These system can be described in terms of object models, functional models and dynamic models as discussed by James Rumbaugh et al. in the book *Object-Oriented Modeling and Design* published in 1991 by Prentice-Hall (the "OOMD") which is herein incorporated by reference in it's entirety. According to the book OOMD, an object model of a system describes the object types which comprise the system and also shows the relationships between the object types. A functional model of the system shows the processes and data structures of the system and the flow of data therebetween but does not indicate the sequence of processing. The dynamic model of the system does show the processing sequence of the system. That sequencing is shown primarily as transitions from one state to another.

Thus, what is needed is a method and system for providing a common communications interface between software application programs.

SUMMARY OF THE INVENTION

The present invention is a method and system which provide a common communications interface between a plurality of different types of software application programs through a communications network. The system and method include an Adapter means associated with and responsive to one of said plurality of programs for connecting said one of said plurality of programs to said communications network.

Also included is a Resource means associated with the Adaptor means and with one of the plurality of software application programs. The Resource means stores at least one identifier, or Resource Name, associated with the software application programs in a Name Space. The Resource means is also responsive to an Agent means associated with another of the plurality of software application programs and generates a View means associating the first software application program with the second software application program. The View means accept communications from the software application programs through said communications network.

The View means, coupled to the Resource means of one software application program, is responsive to another software application program and accepts the data transmitted between the two programs.

The system and method also include Data means, coupled to the View means, which stores the data transmitted between the software application programs.

BRIEF DESCRIPTION OF THE DRAWINGS

For a better understanding of the present invention, reference may be made to the accompanying drawings, in which.

DETAILED DESCRIPTION OF THE INVENTION

The present invention is a method and system for providing a common communications interface between a plurality of software application programs and at least one communications network interface.

Figure 1A:
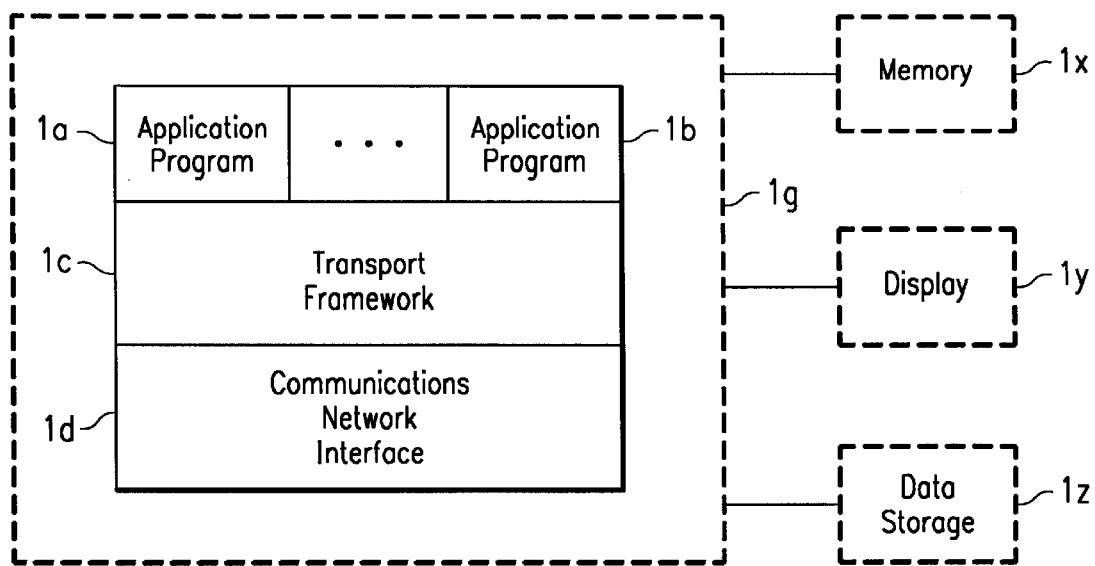
FIG. 1A illustrates one embodiment of the present invention.

FIG. 1A illustrates one embodiment of the present invention where a plurality of software application programs 1a through 1b are coupled to at least one communications network interface 1d by the Transport Framework 1c of the present invention. In the embodiment of the present invention illustrated in FIG. 1A, the plurality of software application programs 1a through 1b the Transport Framework 1c and the communications network interface 1d are all implemented on a general purpose computer which includes a processor 1g, a memory 1x, a display 1y and data storage 1z. Furthermore, the software programs 1a through 1b in this embodiment of the present invention share the same address space in the processor 1g. The software applications program 1a and the software applications program 1b may belong to the same application.

Figure 1B:
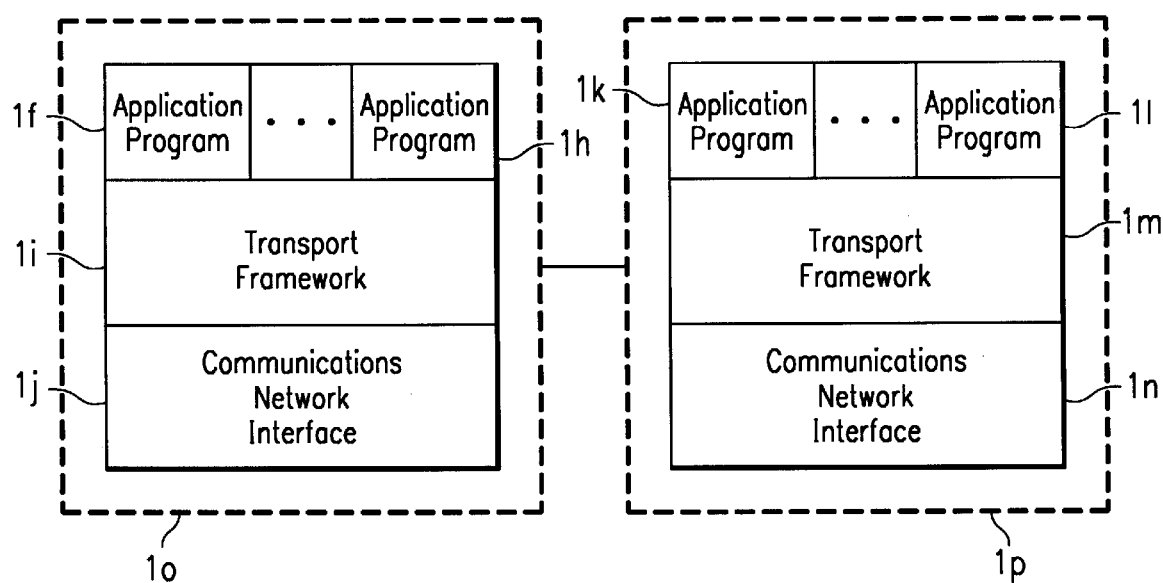
FIG. 1B illustrates another embodiment of the present invention.

FIG. 1B illustrates another embodiment of the present invention which facilitates communication between a first set of software application programs 1f through 1h on a first processor 1o and a second set of software application programs 1k through 1l on a second processor 1p. The first processor 1o includes a first implementation of the Transport Framework 1i which couples the first set of software application programs 1f through 1h to a first communications network interface 1j. The second processor 1p includes a second implementation of the Transport Framework 1m which couples the second set of software application programs 1k through 1l to a second communications network interface 1n.

Figure 1C:
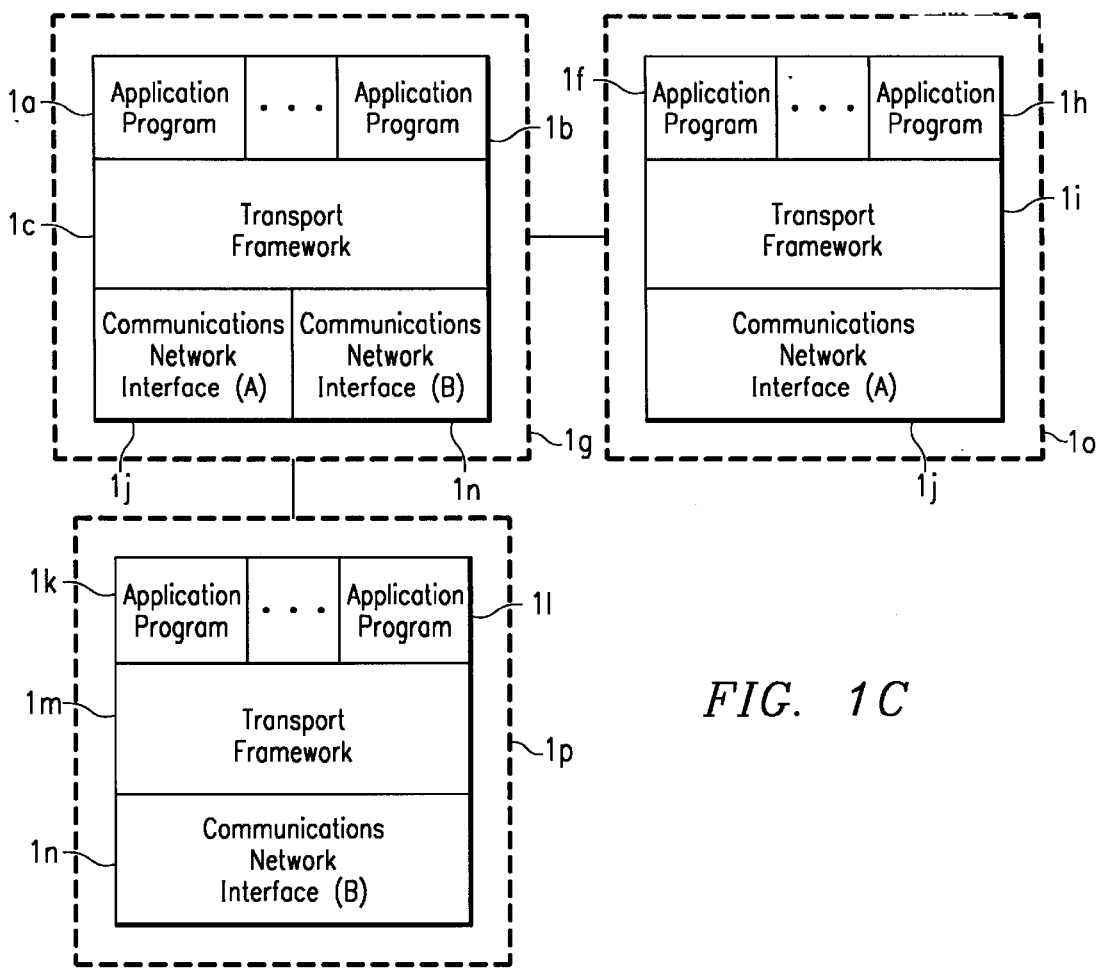
FIG. 1C shows a third embodiment of the present invention.

FIG. 1C illustrates a third embodiment of a system using the present invention in which the software application programs 1a through 1b using the first Transport Framework 1c and a first implementation of the communications network interface (A) 1j, where (A) represents the type of communications network interface, i.e., a PIPES Platform™ implementation, communicate with the software application programs 1f through 1h which use the second Transport Framework 1i and the first implementation of the communications network interface (A) 1j. Similarly, the software application programs 1a through 1b using the first Transport Framework 1c and a second implementation of the communications network interface (B) 1n, where (B) represents, for example, a WinSock implementation of the communications network interface, communicate with the software application programs 1k through 1l which use the Transport Framework implementation 1m and the second implementation of the communications network interface (B) 1n. This embodiment is used where, for example, the software application programs 1a through 1b do not share the same address space as the software application programs 1k through 1l in the processor 1g.

Figure 2:
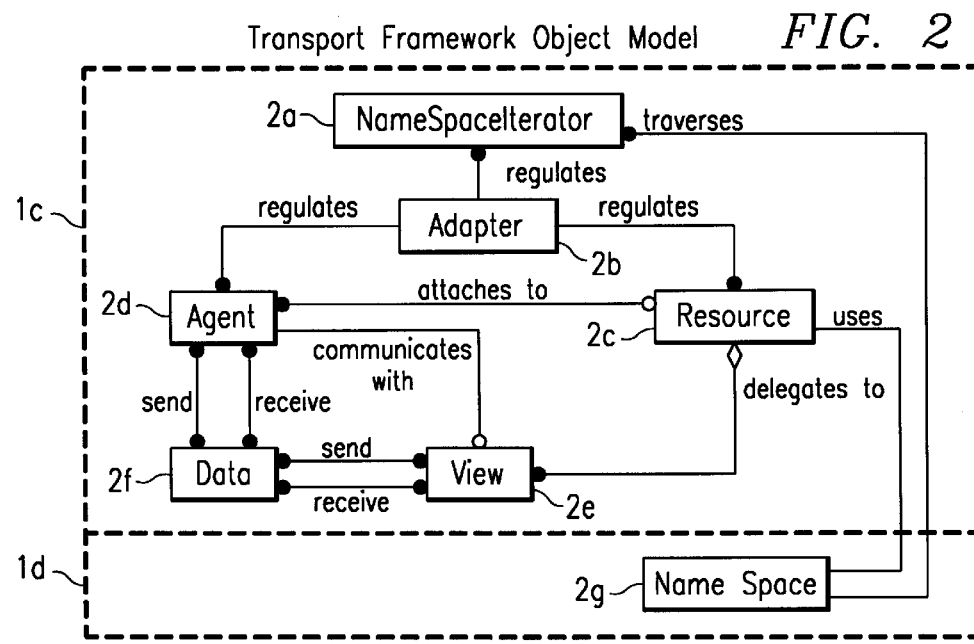
FIG. 2 is an object model of one embodiment of the present invention.

FIG. 2 illustrates one embodiment of an object model of the Transport Framework 1c of the present invention.

The object types associated with the Transport Framework of the present invention, as illustrated in the object model shown in FIG. 2, include a Name Space Iterator object type 2a, an Adapter object type 2b, a Resource object type 2c, an Agent object type 2d, a View object type 2e and a Data object type 2f. Each of the object types shown in FIG. 2 may also include associated data structures and behaviors (or operations). Instantiations of an object type are referred to as objects or object instances. Instantiations of the data structures and behaviors associated with an object type are referred to as attributes and methods, respectively.

The object instances and associated attributes and methods for each of the object types illustrated in FIG. 2 are shown in FIGS. 3, 5, 9, 15, 20 and 25. Instantiations of object types, data structures and behaviors are created when a software application program requests services from a particular implementation of the Transport Framework 1c of the present invention as described in more detail hereinbelow.

Execution of the methods associated with a behavior or the generation of events can transition the associated object instances from one state to another. The various states and transitions associated with object instances of each of the object types shown in FIGS. 3, 5, 9, 15, and 20 are illustrated in FIGS. 4, 6–8, 10–14, 16–19, and 21–24, respectively.

Using the embodiment of the present invention as illustrated in FIG. 2, a first software application program 1a which creates an instance of the Adapter object type 2b associated with a particular communications network implementation 1d and creates at least one instance of the Resource object type 2c associated with the instance of the Adapter object type 2b, is available for communications with a second software application program 1b which has also created an instance of the Adapter object type 2b associated with the same communications network implementation 1c. For the second software application program 1b to initiate communications with the first software application program 1a, the second software application program 1b creates an instance of the Agent object type 2d associated with the instance of the Adapter object 2b.

The second software application program 1b creates an instance of the Name Space Iterator object type 2a to look up a Resource Name associated with the first software application program 1a. Using the Resource Name, the instance of the Agent object type 2d associated with the second software application program 1b then attaches to the instance of the Resource object type 2c associated with the first software application program 1a.

In response to the attachment by the instance of the Agent object type 2d associated with the second software application program 1b, the instance of the Resource object type 2c associated with the first software application program 1a generates an instance of the View object type 2e. Through the instance of the View object type 2e, the second software application program 1b then transmits data to and receives data from the first software application program 1a using instances of the Data object type 2f.

The operations of each of the object types which comprise the Transport Framework 1c are discussed in more detail hereinbelow.

Name Space Iterator

Figure 3:
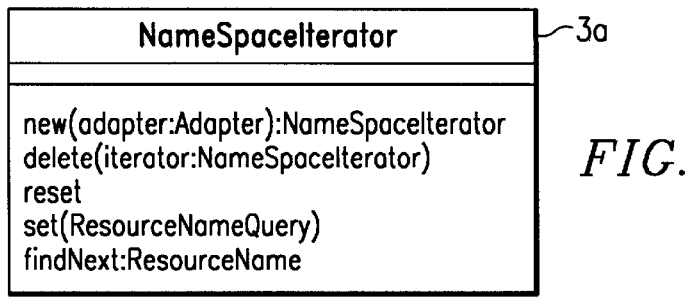
FIG. 3 illustrates an object model of the Name Space Iterator object type of one embodiment of the present invention.

FIG. 3 illustrates the object model for the Name Space Iterator object type 2a. The Name Space Iterator object type 2a includes the behaviors newo, deletes, reseto, set( ) and findnext( ). Using an instance of the Name Space Iterator object type 2a, the second application program 1b searches through a Name Space 2g associated with the communications network implementation 1d to find an active Resource Name associated with the first software application program 1a. The Resource Name is used to attach instances of the Agent object type 2d to instances of the Resource object type 2c. The reset( ) behavior starts the iteration at the "top" of the Name Space 2g. The set( ) behavior allows the user to initialize search criteria for the findnext( ) behavior which then returns the Resource Name which satisfies the search criteria.

Figure 4:
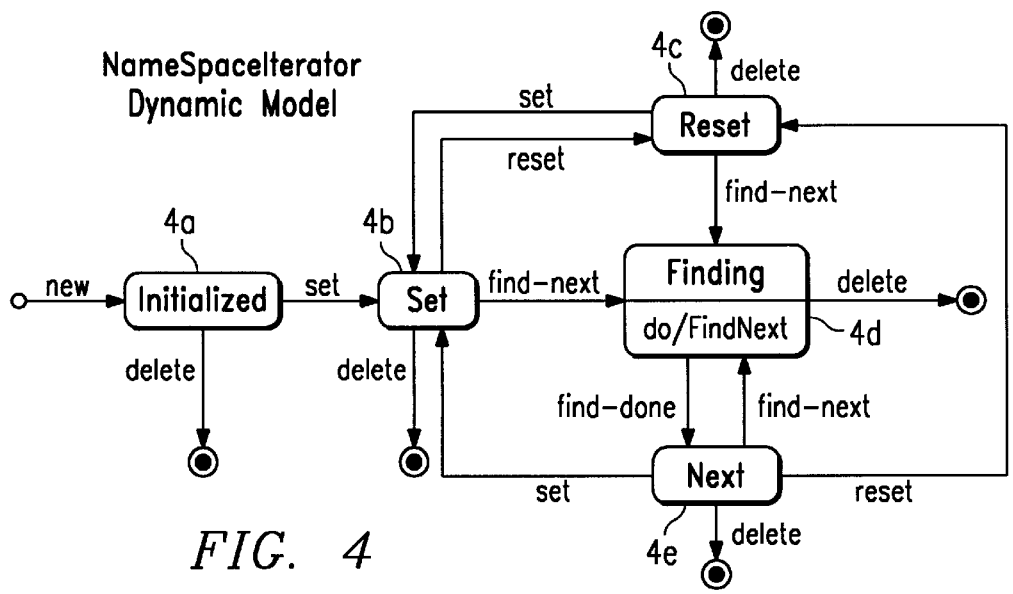
FIG. 4 illustrates a dynamic model of the Name Space Iterator object of one embodiment of present invention.

The dynamic model of the Name Space Iterator object type 2a, shown in FIG. 4, shows the state transitions when the second software application program 1b invokes the methods corresponding to the behaviors associated with the Name Space Iterator object type 2a. The states associated with the Name Space Iterator object type 2a include an Initialized state 4a, a Set state 4b, a Reset state 4c, a Finding state 4d and a Next state 4e.

The Finding state 4d includes the one behavior, to be implemented by the communications network interface 1d, associated with the Name Space Iterator object type 2a which is to find a given Resource Name in the Name Space 2g which matches a given search criteria. Once the Resource Name associated with the software application program 1a is found, communications with that software application program 1a can be initialized. To prevent another software application program 1b from initiating communications with the software applications program 1a, no Resource Name for the software application program 1a would exist in the Name Space 2g.

Adapter

Figure 5:
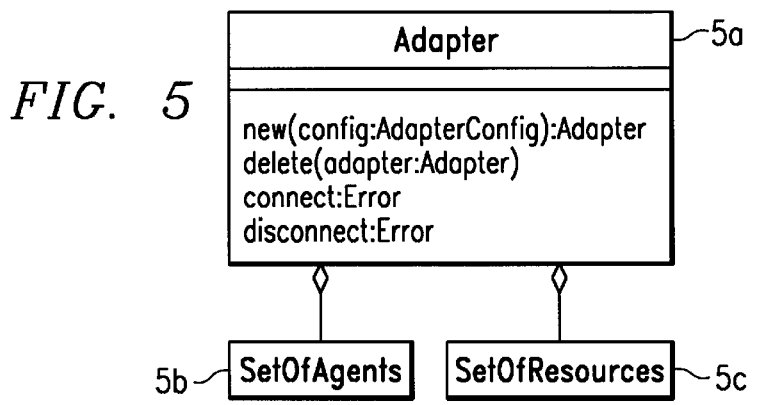
FIG. 5 shows an object model of the Adapter object type of one embodiment of the present invention.

The Adapter object type 2b, shown in detail in the object model in FIG. 5, along with the Name Space Iterator object type 2a, provides a management interface for Agent object types 2d and Resource object types 2c associated with a particular communications network implementation 1d. The management interface provided by the Adapter object type 2d includes management operations such as creating, modifying and removing associations between application programs and Resource object types 2c, between Resource object types 2c and communications network implementations 1d and between Resource object types 2c and Agent object types 2d.

The instances of an Agent object type 2d associated with a particular instance of an Adapter object type 2b are stored in the data structure Set of Agents 5b. The instances of a resource object types 2c associated with a particular instance of an Adapter object type 2b are stored in the data structure Set of Resources 5c. Both the Set of Agents 5b and the Set of Resources 5c data structures are implemented, for example, as doubly linked lists of agent identifiers and resource identifiers in one embodiment of the present invention.

The behaviors for the Adapter object type 2b include new( ), delete( ), connect( ) and disconnect( ). The connect( ) behavior connects the software application program 1a to the communications network implementation 1d. The disconnect( ) behavior disconnects the software application program 1a from the communications network implementation 1d. There is one instance of an Adapter object type 2b for each address space which associates the software application program 1a with the communications network implementation 1d.

Figure 6:
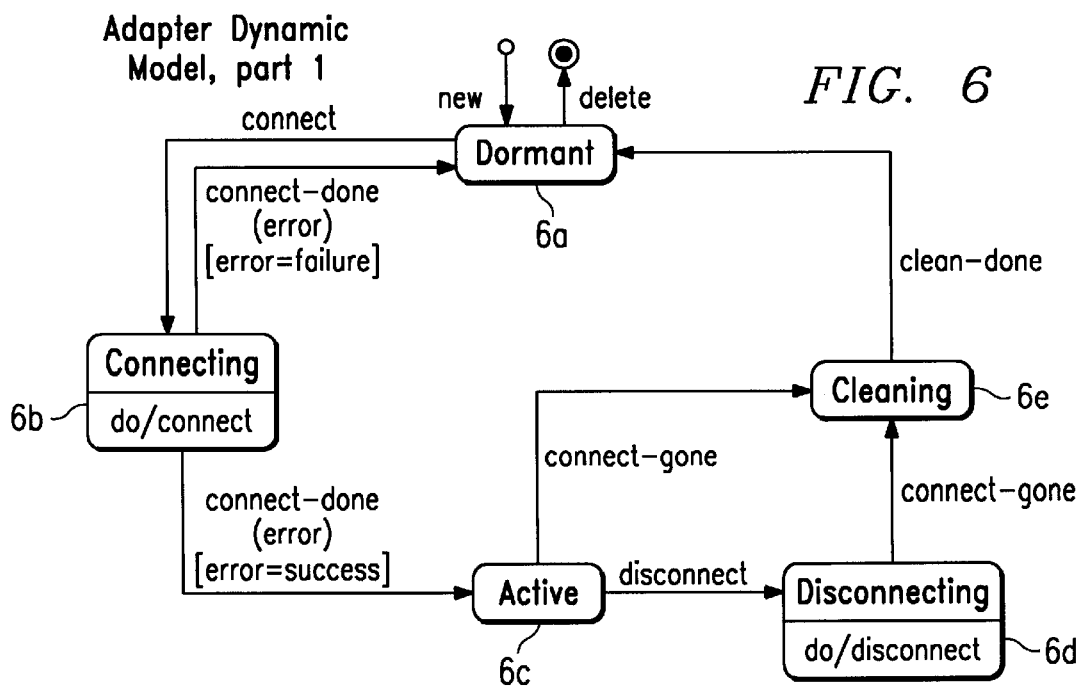
FIGS. 6–8 depict dynamic models of the Adapter object of one embodiment of the present invention.
Figure 7:
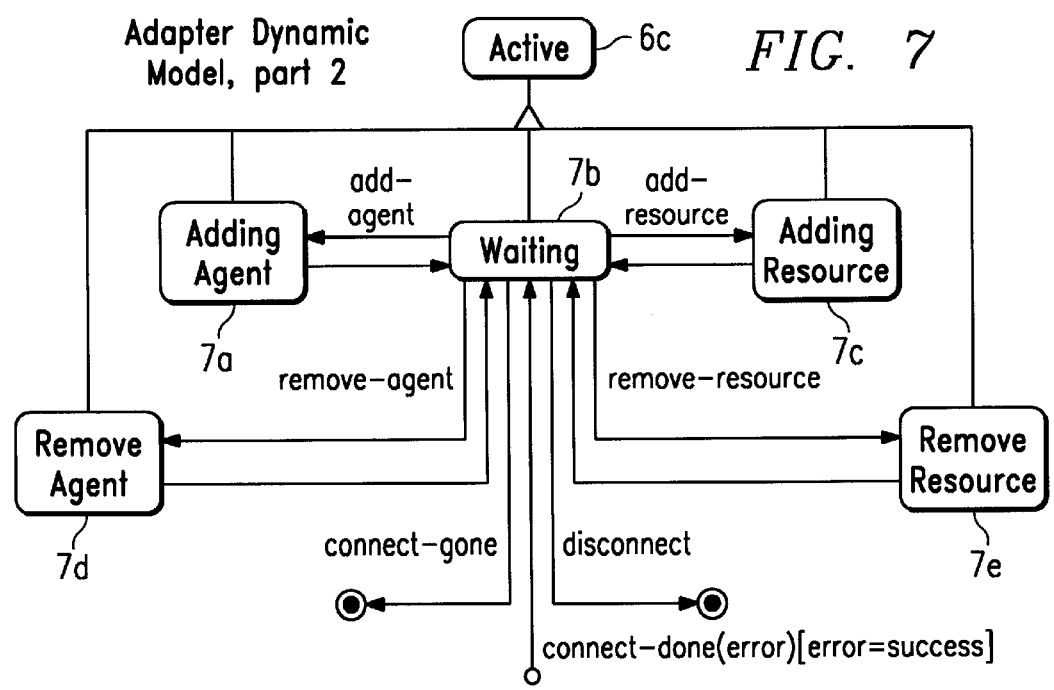
Figure 8:
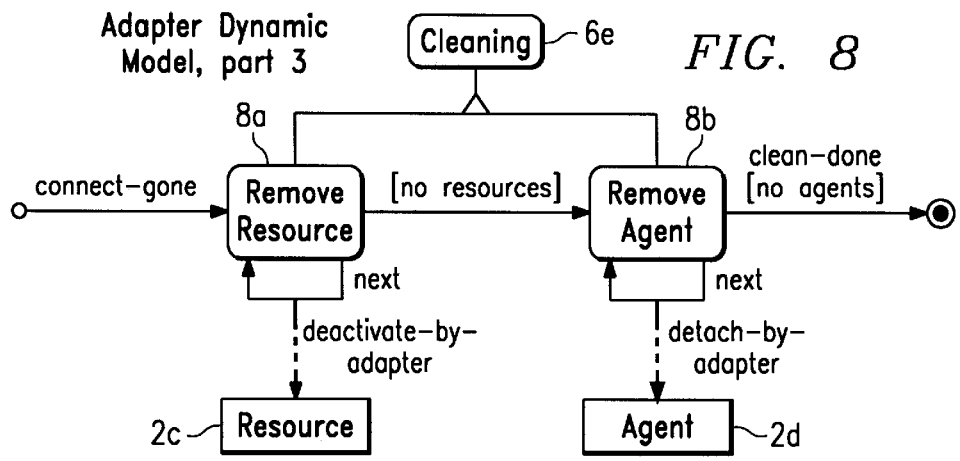

Dynamic models of the Adapter object type 2b are shown in FIGS. 6–8. FIG. 6 shows that, in general, execution of the behaviors associated with the Adapter object type 2b transition instances of the Adapter object type 2b between at least five states which include a Dormant state 6a, a Connecting state 6b, a Cleaning state 6e, a Disconnecting state 6d and an Active state 6c.

When the software application program 1a successfully creates an instance of the Adapter object type 2b using the new( ) behavior, the new instance of the Adapter object type 2b transitions to the Dormant state 6a. When creating the new instance of the Adapter object type 2b, the software application program 1a sends to the new( ) behavior an attribute called Adapter Configuration which includes configuration attribute data particular to the communications network implementation 1d associated with the new instance of the Adapter object type 2b. If successful in creating the new instance of the Adapter object type 2b, the new( ) behavior returns the attribute Adapter Handle which is used as an identifier.

Once in the Dormant state 6a, the instance of the Adapter object type 2b can either transition to the Connecting state 6b or be deleted.

If the software application program 1a issues the delete( ) behavior while the instance of the Adapter object type 2b is in the Dormant state 6a, the instance of the Adapter object identified by the attribute Adapter Handle is deleted.

If the application program 1a issues the connect( ) behavior while the instance of the Adapter object type 2b is in the Dormant state 6a, the instance of the Adapter object type 2b transitions to the Connecting state 6b. While in the Connecting state 6b, the instance of the Adapter object type 2b performs any steps required by the communications network implementation 1d to initialize the software application program 1a to use the communications network implementation 1d. An Error attribute is generated by the connect( ) behavior indicating the success or failure in creating the connection.

When all processing is complete for the Connecting state 6b, a connect-done event occurs which transitions the instance of the Adapter object type 2b to either the Dormant state 6a or the Active state 6c depending upon the value of the Error attribute. If the value of the Error attribute is failure, then the transition is to the Dormant state 6a; otherwise the transition is to the Active state 6c. The processing which occurs during the Active state 6c is further illustrated in the dynamic model shown in FIG. 7.

FIG. 7 shows that the Active state 6c of the instance of the Adapter object type 2b includes an Adding Agent state 7a, a Waiting state 7b, an Adding Resource state 7c, a Remove Agent state 7d and a Remove Resource state 7e which represent the processes done in the Active state 6c of adding to and removing from the Set of Agents 5b and the Set of Resources 5c data structures instances of the Agent object types 2d and of the Resource object types 2c, respectively in response to the software application program 1a.

As further illustrated in FIG. 6, from the Active state 6c, the instance of the Adapter object type 2b can transition to the Cleaning state 6e or the Disconnecting state 6d. The application program 1a can trigger the disconnect event and cause the instance of the Adapter object type 2b to transition to the Disconnecting state 6d by issuing the disconnect( ) behavior. While in the Disconnecting state 6d, the instance of the Adapter object type 2b performs any operations required by the communications network implementation 1d to terminate the connection to the application program 1a. When all processing is complete for the Disconnecting state 6d, the connect-gone event is triggered causing the instance of the Adapter object type 2b to transition to the Cleaning state 6e, the operation of which is discussed hereinbelow.

The connect-gone event can also occur when the instance of the Adapter object type 2b is in the Active state 6c and is triggered from within the Transport Framework 1c when a condition arises in which the application program 1a associated with the instance of the Adapter object type 2b can no longer use the communications network implementation 1d. This condition is usually caused by a catastrophic event such as a software failure of the communications network implementation 1d. When the connect-gone event is triggered while the instance of the Adapter object type 2b is in the Active state 6c, the instance of the Adapter object type 2b again transitions to the Cleaning state 6e.

FIG. 8 shows a dynamic model further illustrating the Cleaning state 6e of the instance of the Adapter object type 2b shown in FIG. 6. The Cleaning state 6e of the instance of the Adapter object type 2b includes a Remove Resources state 8a and a Remove Agent state 8b. Thus, one purpose of the Cleaning state 6e is to remove the associations between instances of the Adapter object type 2b and instances of the Agent object type 2d and between instances of the Adapter object type 2b and the Resource object type 2c when the Adapter object type 2b is disconnected from the communications network interface 1d. The Cleaning state 6e also notifies instances of the Agent object type 2d and of the Resource object type 2c that the connection with the communications network interface 1d is gone.

Resource

The Resource object type 2c provides the software application program 1a a means to advertise a name for another applications program 1b to use when wanting to communicate with the software application program 1a. For example, if the software application program 1a wants to allow the software applications program 1b to communicate with it, then the software application program 1a generates and activates an instance of the Resource object type 2c.

The Resource object type 2c also generates and manages instances of the View object type 2e, through which communication actually occurs, as discussed in more detail hereinbelow.

Figure 9:
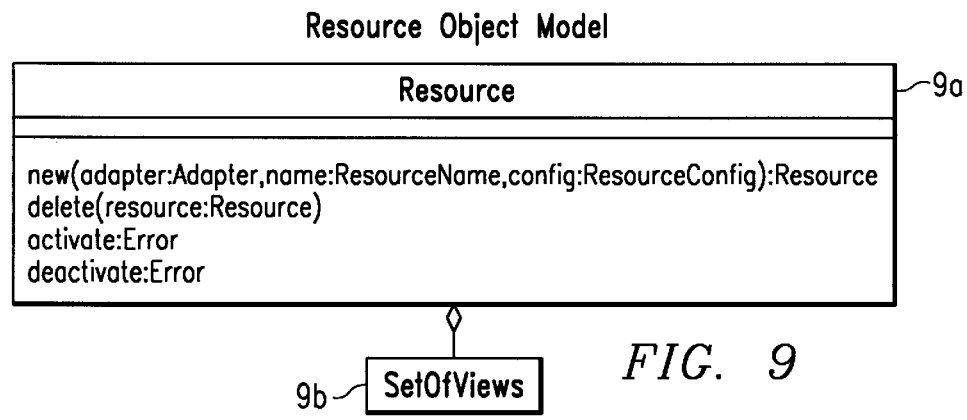
FIG. 9 shows an object model of the Resource object of one embodiment of the present invention.

FIG. 9 illustrates an object model for the Resource object type 2c. As shown in FIG. 9, the behaviors associated with the Resource object type 2c include new( ), delete( ), activate( ) and deactivate( ). Also associated with the Resource object type 2c is the data structure Set of Views 9b.

The new( ) behavior creates an instance of the Resource object type 2c and associates it with the software application program 1a. When creating the instance of the Resource object type 2c, the software application program 1a uses an Adapter Handle attribute (which associates the instance of the Resource object type 2c with an active instance of the Adapter object type 2b), a Resource Name (an identification name to activate in the Name Space 2g associated with the communications network implementation 1d) and a Resource Configuration attribute which includes data particular to the communications network implementation 1d.

The activate( ) behavior activates the instance of the Resource object type 2c by placing the associated Resource Name into the Name Space 2g associated with the communications network implementation 1d. The software application program 1a can have multiple instances of the Resource object type 2c associated with it. However, each instance of the Resource object type 2c must be uniquely named in the Name Space 2g.

The deactivate( ) behavior deactivates the instance of the Resource object type 2c by removing the Resource Name associated with the instance of the Resource object type 2c from the Name Space 2g.

Figure 10:
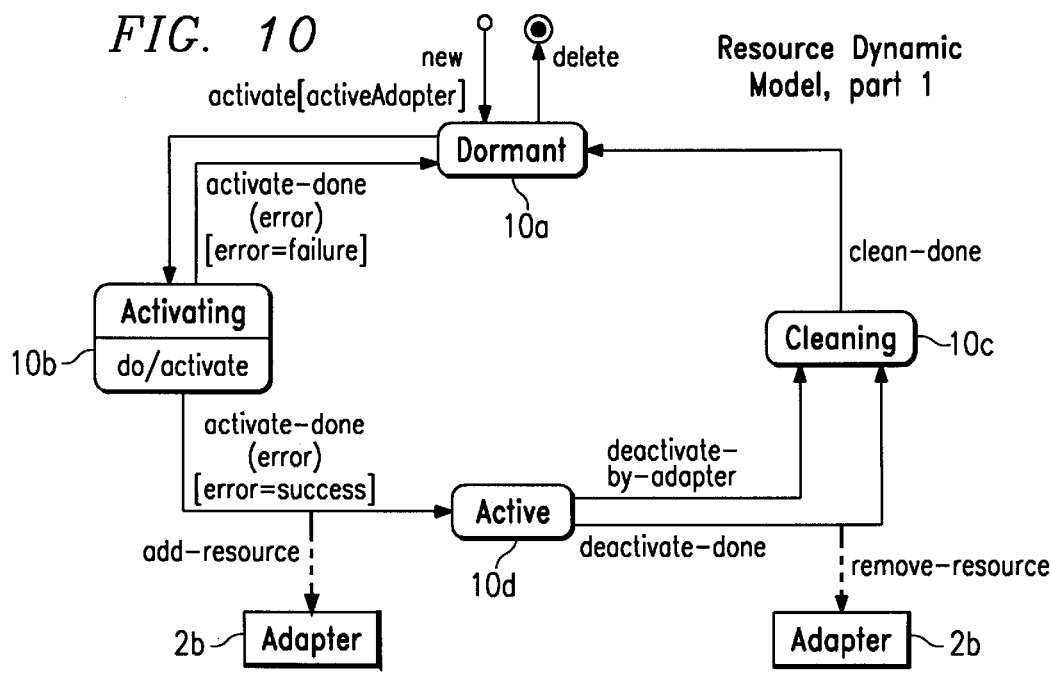
FIGS. 10–14 illustrate dynamic models of the Resource object of one embodiment of the present invention.

As shown in FIG. 10, instances of the Resource object type 2c transition between four states: a Dormant state 10a, an Activating state 10bb, a Cleaning state 10c and an Active state 10d.

When an application program 1a successfully creates an instance of the Resource object type 2c, the instance of the Resource object type 2c transitions to the Dormant state 10a. Once in the Dormant state 10a, the instance of the Resource object type 2c can transition to the Activating state 10b or be deleted.

A software application program 1a issuing the activate( ) behavior will transition to the Activating state 10b if the associated instance of the Adapter object type 2b is in the Active state 6c. During the Activating state 10b the instance of the Resource object type 2c performs any steps required by the communications network implementation 1d to put the Resource Name associated with the instance of the Resource object type 2c into the Name Space 2g.

When all processing is complete for the Activating state 10b, an activate-done event is triggered and the instance of the Resource object type 2c will either transition to the Dormant state 10a or to the Active state 10d depending upon the value of an Error attribute returned by the activate-done event. If the Error attribute has a failure value, the transition is back to the Dormant state 10a. Otherwise, the instance of the Resource object type 2c is added to the data structure Set of Resources 5c associated with the instance of the Adapter object type 2b and the instance of the Resource object type 2c transitions to the Active state 10d.

Figure 11:
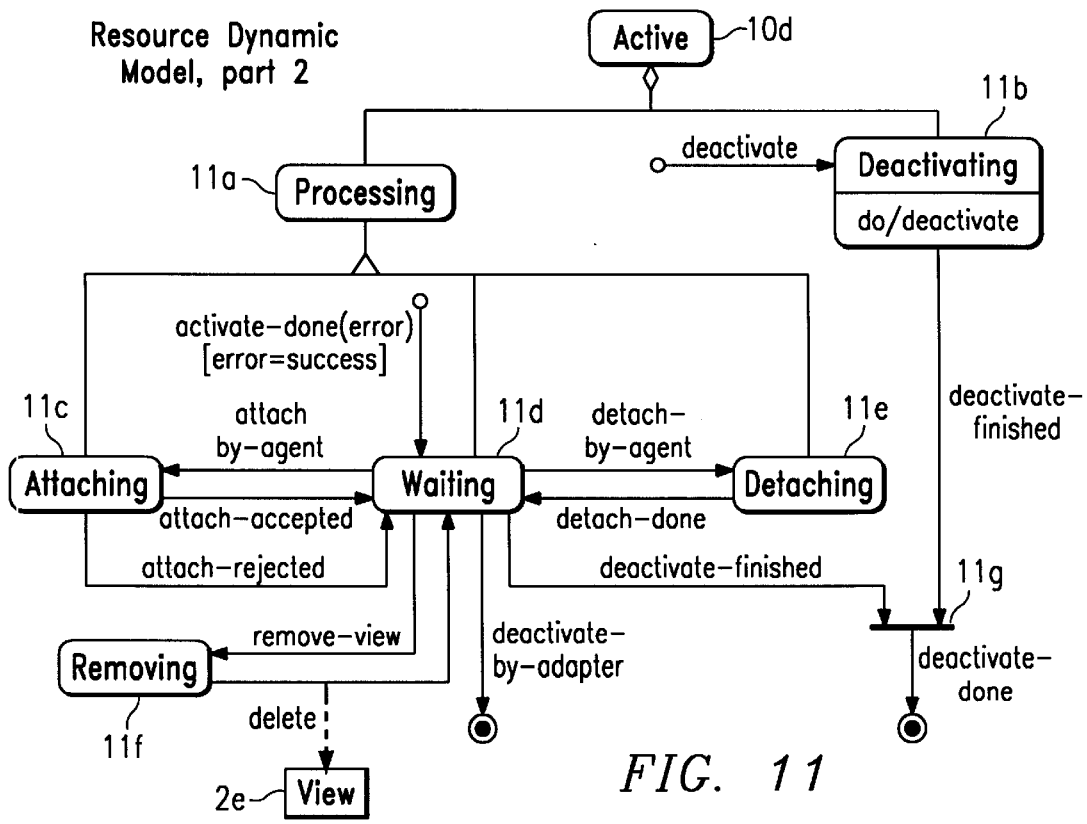

The processing done by the instance of the Resource object type 2c while in the Active state 10d is illustrated in FIG. 11. The instance of the Resource object type 2c, while in the Active state 10d is in either the Processing state 11a or the Deactivating state 11b or can be in both concurrently.

The Processing state 11a includes an Attaching state 11c, a Waiting state 11d, a Detaching state 11e and a Removing state 11f. The Attaching state 11c and the Detaching state 11e are illustrated in more detail in the dynamic models shown in FIG. 12 and FIG. 13, respectively and control the attach and detach of instances of the Agent object type 2d with the instance of the Resource object type 2c, respectively.

Figure 12:
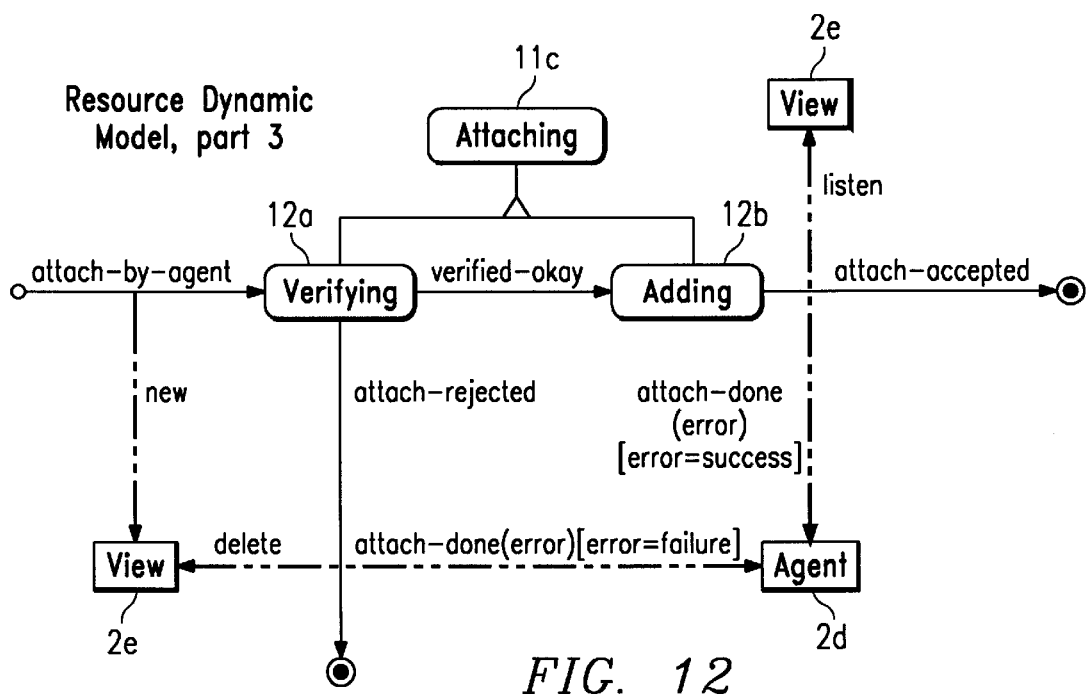

As shown in FIG. 12, when an instance of the Agent object type 2d transmits the attach-by-agent event, the instance of the Resource object type 2c transitions to the Verifying state 12a after generating a new instance of the View object type 2e. If successfully verified, the new instance of the View object type 2e is added to the Set of Views 9b in the Adding state 12b and a listen event is sent to the instance of the View object type 2e, thereby transitioning the new instance of the View object type 2e from the Dormant state 21a to the Active state 21b, discussed further hereinbelow. Also, an attach done event is sent to the Agent object type 2d verifying to the Agent object type 2d that the attach was successful.

If the verification is not successful, the attach is rejected and the new instance of the View object type 2e is deleted. The instance of the Agent object type 2d attempting to attach to the instance of the Resource object type 2c which initiated the creation of the new instance of the View object type 2e is notified that the attach was unsuccessful.

Figure 13:
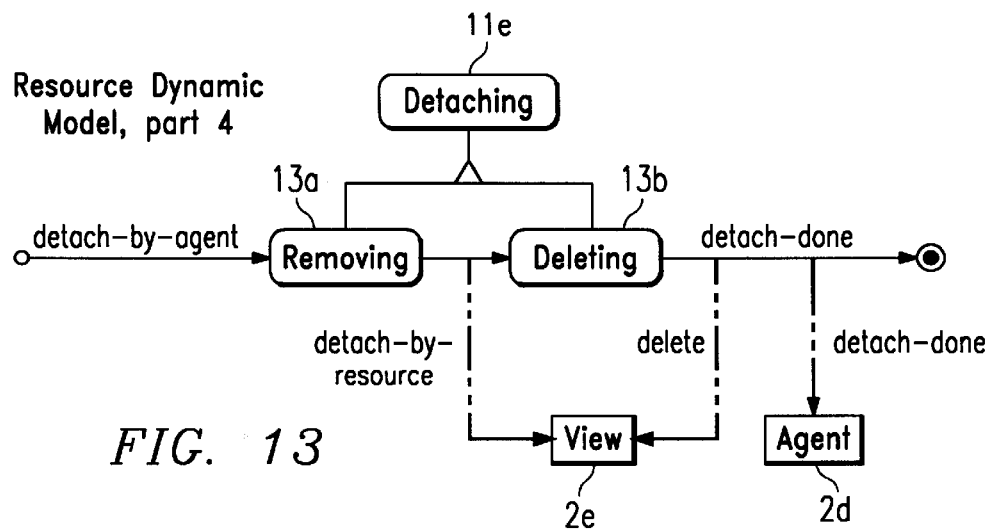

The Detaching state 11e of the instance of the Resource object type 2c, illustrated in more detail in FIG. 13, is entered into when the instance of the Agent object type 2d sends a detach-by-agent event to the instance of the Resource object type 2c. In response, the instance of the Resource object type 2c enters the Removing state 13e and sends a detach-by-resource event to the associated instance of the View object type 2e, thereby ending the association. The instance of the Resource object type 2c then transitions to the Deleting state 13b where the reference to the instance of the View object type 2e and the instance of the View object type 2e are deleted from the Set of Views 9b. Finally, the detach-done event is sent to the associated instance of the Agent object type 2d.

Returning to the processing shown in the dynamic model of FIG. 11, the software application program 1a triggers the deactivate event and transitions the instance of the Resource object type 2c to the Deactivating state 11b within the Active state 10d by calling the deactivates behavior. During the Deactivating state 11b the communications network implementation 1d performs any steps necessary to remove the associated Resource Name from the Name Space 2g.

When completed, a deactivate-finished event is generated and synchronized with a second deactivate-finished event generated from the Waiting state 11d. The synchronization of the deactivating-finished events at sync point 11g signifies that the instance of the Resource object type 9a transitions to the Cleaning state 10c. The instance of the Resource object type 9a can also transition to the Cleaning state 10c by a deactivate-by-adapter event generated when the associated instance of the Adapter object 2b terminates the connection to the communications network implementation 1d because of some uncontrollable, catastrophic event such as a software or hardware failure of the communications network implementation 1d.

Returning to the operations of the Resource object dynamic model shown in FIG. 10, from the Active state 10d, upon receipt of deactivate-done event or the deactivate-by-adapter event, the instance of the Resource object type 2c transitions to the Cleaning state 10c. The receipt of the deactivate-done event also triggers a remove-resource event which is sent to the associated instance of the Adapter object 2b.

Figure 14:
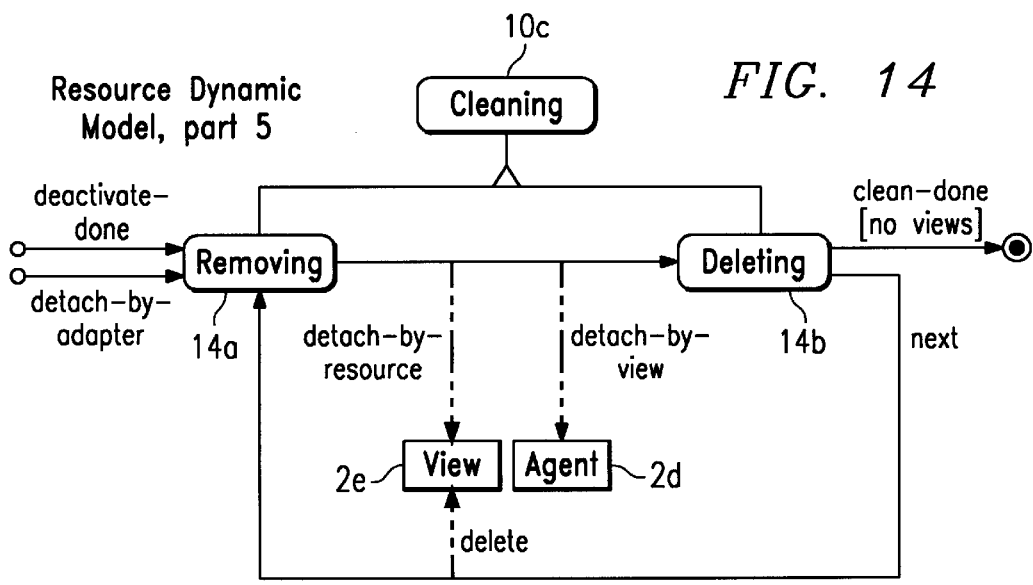

The Cleaning state 10c is illustrated in detail in FIG. 14. In response to a deactivate-done event from the associated instance of the Resource object type 2c or in response to a detach-by-adapter event from the associated instance of the Adapter object type 2b, the instance of the Resource object type 2c enters the Removing state 14a.

From the Removing state 14a, a detach-by-resource event is sent to the associated instance of the View object type 2c and a detach-by-view event is also sent to the associated instance of the Agent object type 2d and the instance of the Resource object type 2e transitions to the Deleting state 14b. From the Deleting state 14b, the associated instance of the View object type 2e is deleted and the Resource object type 2e transitions back to the Removing state 14a. Processing continues in this manner until all instances of the View object type 2e are removed from the Set of Views 9b. Upon completion, a clean-done event is triggered, thereby transitioning the instance of the Resource object type 2e to the Dormant state 10a.

Agent

The Agent object type 2d provides the application program 1b with means to send data to and receive data from the application program 1a which has activated an instance of the Resource object type 2c. For example, if the application program 1a activates an instance of the Resource object type 2c, then the application program 1b will use an instance of the Agent object type 2d to communicate with the application program 1a by attaching the instance of the Agent object type 2d to the instance of the Resource object type 2c associated with the application program 1a.

Figure 15:
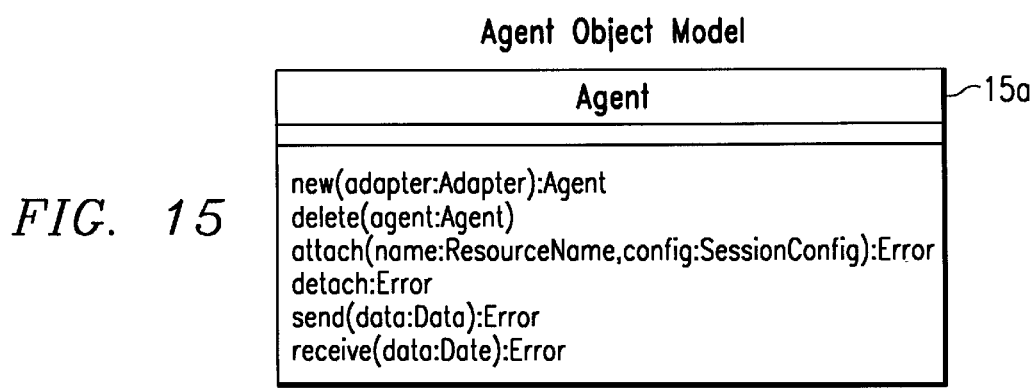
FIG. 15 illustrates an object model of the Agent object of one embodiment of the present invention.

The object model for the Agent object type 2d is shown in FIG. 15. As shown in FIG. 15, the Agent object type 2d includes the behaviors attach, detach, send and receive. The attach behavior attaches the instance of the Agent object type 2d associated with the application program 1b to the instance of the Resource object type 2c associated with the software application program 1a thereby enabling communications between the two application programs.

The detach behavior detaches the instance of the Agent object type 2d associated with the applications program 1b from instance of the Resource object type 2c associated with the applications program 1a thereby disabling communication between the two application programs. Using the send behavior, the application program 1a sends data to the attached application program 1b through the associated instance of the View object type 2e. Using the receive behavior, the application program 1a receives data from the attached application program 1b. The application program 1b can be associated with multiple instances of the Agent object type 2d, each instance of the Agent object type 2d associated with one or a multiple number of different application programs.

Figure 16:
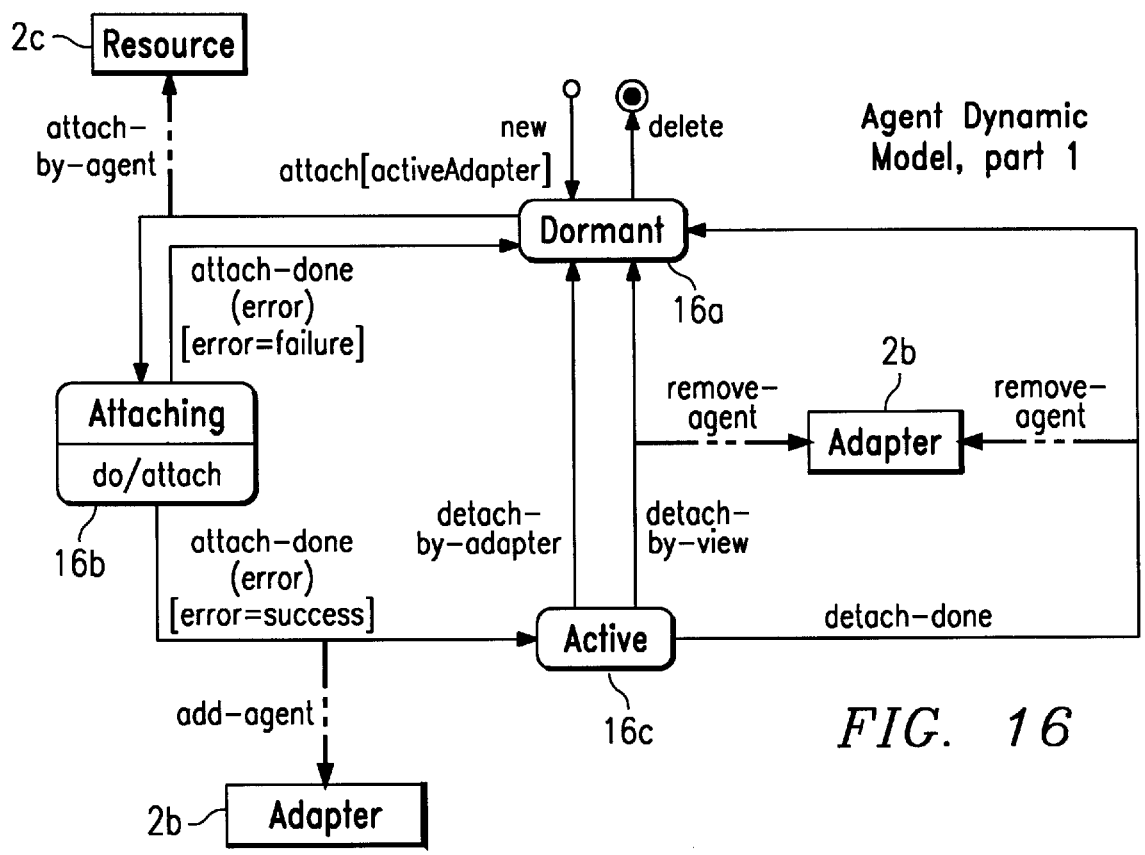
FIGS. 16–19 show dynamic models illustrating the general operation of the Agent object of one embodiment of the present invention.

The dynamic model for instances of the Agent object type 2d is shown in FIGS. 16–19. As shown in FIG. 16, the instance of the Agent object type 2d transitions between three states: a Dormant state 16a, an Attaching state 16b, and an Active state 16c.

When an application program 1b successfully creates an instance of the Agent object type 2d, the instance of the Agent object type 2d transitions to the Dormant state 16a. When creating the instance of the Agent object type 2d, the application program 1b references an associated instance of the Adapter object type 2b. Once in the Dormant state 16a, the instance of the Agent object type 2d may either transition to the Attaching state 16b or be deleted.

The attach event is triggered when the application program 1b issues the attach behavior only if the associated instance of the Adapter object type 2b is in the Active state 6c. During the Attaching state 16b, the Transport Framework implementation 1c performs the steps required to attach the application program 1b to the application program 1a corresponding to the given identification.

When processing has completed for the Attaching state 16b, the attach-done event is triggered. If the resulting Error attribute value is failure then the instance of the Agent object type 2d transitions to the Dormant state 16a. Otherwise, the instance of the Agent object type 2d transitions to the Active state 16c.

Figure 17:
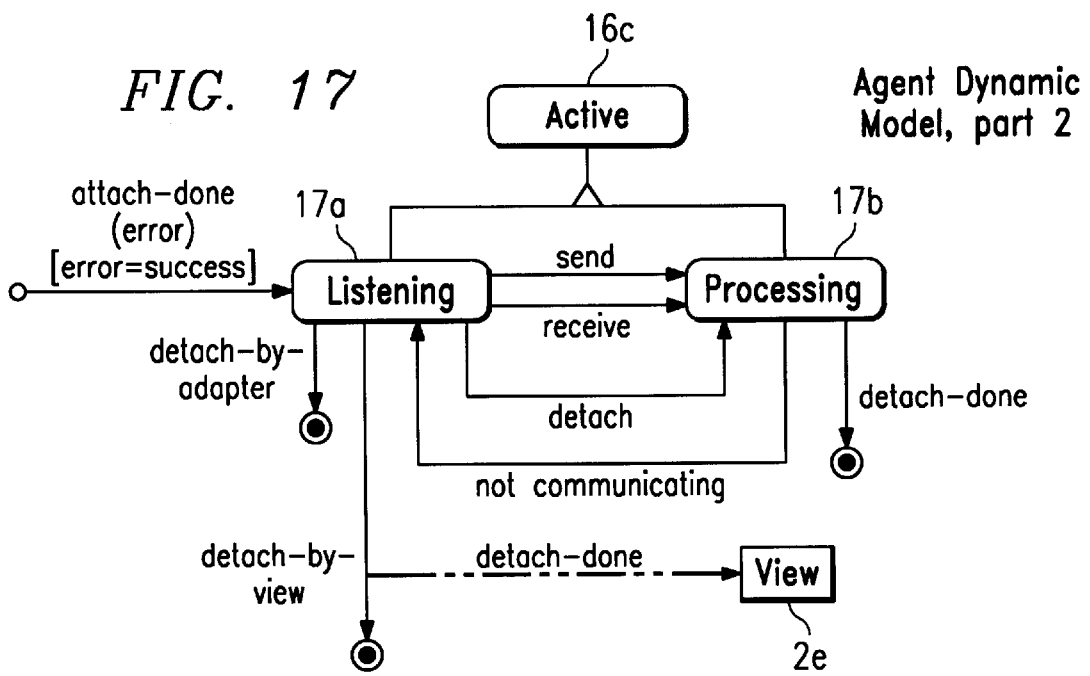

The Active state 16c, as further illustrated in FIG. 17, includes two states: Listening 17a and Processing 17b. Once in the Active state 16c, the instance of the Agent object type 2d can be in either the Listening state 17a or the Processing state 17b. The instance of the Resource object type 2c triggers the transition of the instance of the Agent object type 2d to the Listening state 17a during which time the instance of the Agent object type 2d awaits action from the software application program 1b. The software application program 1b causes the transition of the instance of the Agent object type 2d to the Processing state 17b. The other events are the results of activities in other states (except for the detach-by-view event which is sent by the instance of the View object type 2e).

Once the Agent object type 2d is in the Active state 16c, the application program 1b may trigger the send or receive events by issuing the send or receive behavior, respectively. The events may occur concurrently, not only between themselves, but with themselves. For example, an application program 1b can trigger two send or two receive events, all concurrently.

Figure 18:
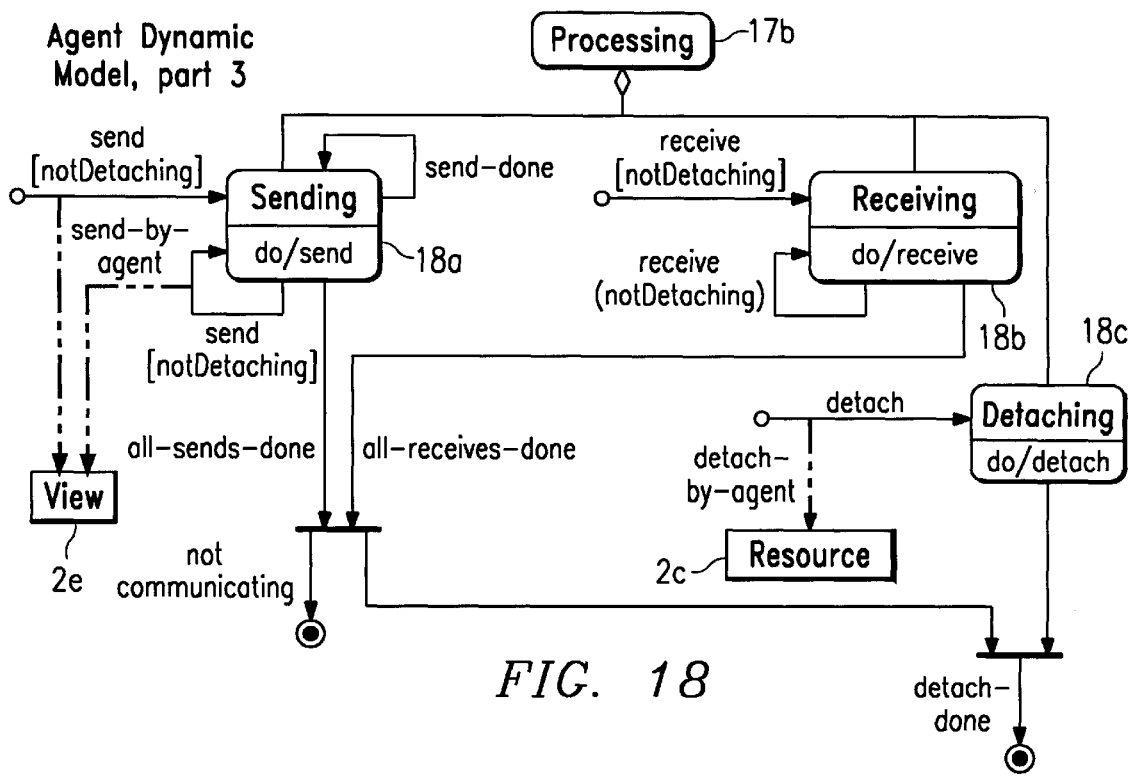

The Processing state 17b is further illustrated in FIG. 18. As shown in FIG. 18, the Processing state 17b includes a Sending state 18a, a Receiving state 18b and a Detaching state 18c. The Agent object type 2d can be in any or all of these states simultaneously. However, neither the Sending state 18a nor the Receiving state 18b may be entered if the Agent object type 2d is in the Detaching state 18c.

During the Sending state 18a, the Transport Framework implementation 1c performs the steps required by the communications network implementation 1d to send data to the attached applications program 1b. When the processing is complete, the send-done event is triggered.

Figure 19:
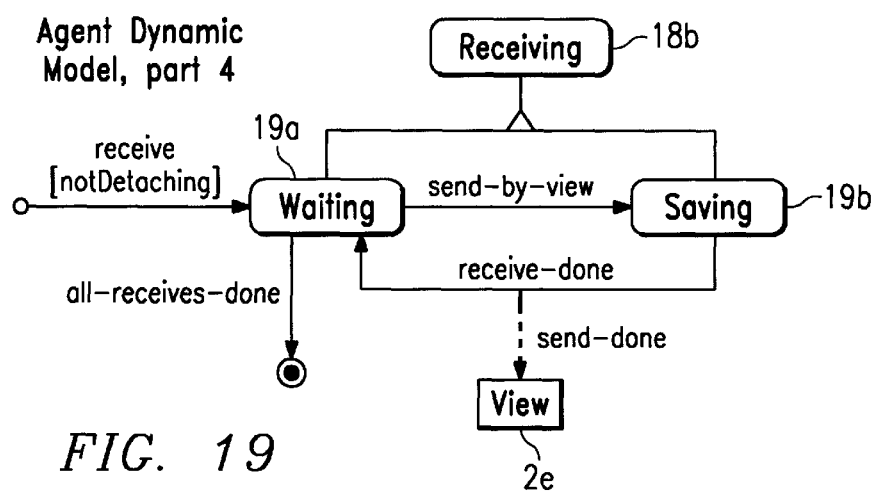

During the Receiving state 18b, further illustrated in the dynamic model shown in FIG. 19, the Transport Framework implementation 1c performs any steps required by the communication network implementation 1d to receive data from the attached application program 1b. When the processing is complete for the receive behavior the receive-done event is triggered.

The instance of the Agent object type 2d transitions to the Detaching state 18c upon receipt of a detach event from the software application program 1a which initiated creation of the instance of the Agent object type 2d. The applications program 1a triggers the detach event when issuing the detach behavior.

When the detach event is triggered, the instance of the Agent object type 2d transitions to the Detaching state 18c during which the Transport Framework implementation 1c performs the steps necessary for the communications network implementation 1d to detach the attached applications program 1b. When detaching is complete and all sends and receives have issued their send-done and receive-done events, respectively, a detach-done event is triggered.

View

One purpose of the View object type 2e is to provide the applications program 1a with a means to send data to and receive data from the applications program 1b which has attached an instance of the Agent object type 2d to an instance of the Resource object type 2c associated with the applications program 1a. Another way to describe instances of the View object type 2e is as delegated liaisons for the associated instance of the Resource object type 2c. The instance of the Resource object type 2c does not handle any communication details, but instead leaves that work for the instances of the View object type 2e.

As an example, suppose the applications program 1a creates and activates an associated instance of the Resource object type 2c and the applications program 1b creates an associated instance of the Agent object type 2d and attaches the associated instance of the Agent object type 2d to the instance of the Resource object type 2c associated with the applications program 1a. The associated instance of the Resource object type 2c delegates further communications to the instance of the View object type 2e associated with the instance of the Resource object 2c, which application program 1a will use to communicate with application program 1b through the instance of the Agent object type 2d associated with the application program 1b.

Figure 20:
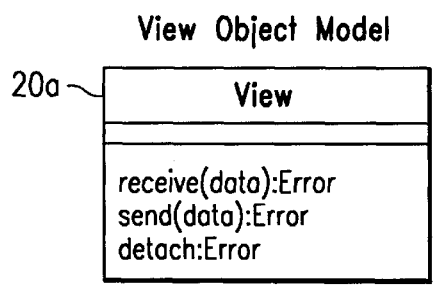
FIG. 20 illustrates an object model of the View object of one embodiment of the present invention.

The object model for the View object type 2e is shown in FIG. 20. As shown in FIG. 20, the behaviors for a View object type 2e include detach, send and receive. The detach behavior detaches the instance of the Resource object type 2c associated with the application program 1a from the application program 1b with the associated instance of the Agent object type 2d. The send behavior sends data to the application program 1b with the associated instance of the Agent object type 2d. The receive behavior receives data from the application program 1b with the associated instance of the Agent object type 2d.

An associated instance of the View object type 2e will not be created if the corresponding instance of the Resource object type 2c is not in the Active state. Furthermore, an active instance of the Resource object type 2c can create multiple instances of the View object type 2e. The application program 1b does not create instances of the View object type 2e, but can use the instances of the View object type 2e created by the instance of the Resource object type 2c associated with the applications program 1a.

Figure 21:
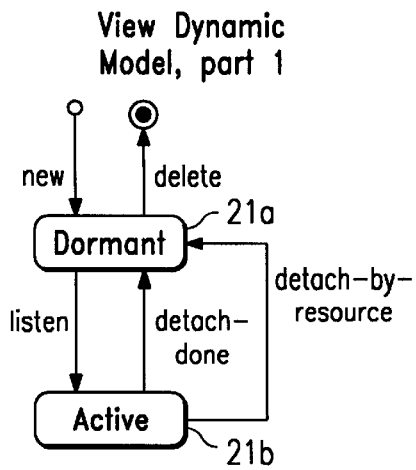
FIGS. 21–24 depict dynamic models illustrating the general operation of the View object of one embodiment of the present invention.
Figure 22:
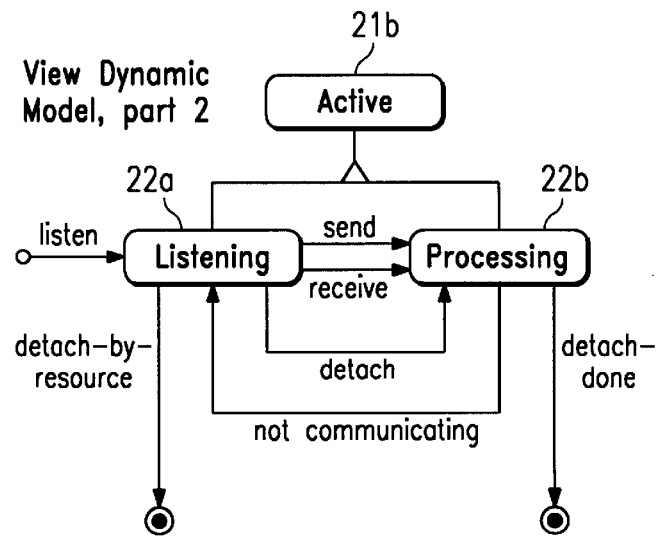

As shown in the dynamic model in FIG. 21, an instance of the View object type 2e transitions between a Dormant state 21a and an Active state 21b. The Active state 21b, as shown in FIG. 22, has two states: a Listening state 22a and a Processing state 22b, which are concurrent states.

When the attach-by-agent event (issued from the Attaching state 16b of an instance of the Agent object type 2d) is received by the instance of the Resource object type 2c, the instance of the Resource object type 2c will trigger the new event to create an instance of the View object type 2e. The instance of the Resource object type 2c is used as an attribute for the event. The attach-by-agent event occurs while the instance of the Resource object type 2c is in the Active state 10d. Upon verification and addition of the instance of the View object type 2e to the Set of Views 9b, the instance of the Resource object type 2c sends the listen event to the instance of the View object type 2e, which then transitions the instance of the View object type 2e to the Listening state 22a of the Active state 21b.

Once the instance of the View object type 2e is in the Listening state 22a, the application program 1a can use the send and receive behaviors to trigger the send and receive events, respectively. The send event, as shown in the dynamic model in FIG. 23, transitions the instance of the View object type 2e to the Sending state 23a of the Processing state 22b and generates a send-by-view event to the associated instance of the Agent object type 2d. It is during the Sending state 23a that the Transport Framework implementation 1c performs any steps required by the communications network implementation 1d to send the data to the application program 1b through its associated instance of the Agent object type 2d. When all processing is complete for the sending behavior, a send-done event is triggered.

The receive event will transition the instance of the View object type 2e to a state of the Processing state 2b called the Receiving state 23b. During the Receiving state 23b, as further illustrated in FIG. 24, the Transport Framework implementation 1c will perform any steps required by the communications network implementation 1d to receive data from the application program 1b through its associated instance of the Agent object type 2d. When processing is completed for the receive behavior, a receive-done event is triggered and a send-done event is sent to the associated instance of the Agent object type 2d.

The send and receive events can occur concurrently, not only between themselves, but with themselves. For example, the application program 1b can trigger two send and two receive events, all concurrently.

The detach event, received while the instance of the View object type 2e is in the Listening state 22a, is triggered when the application program 1a issues the detach behavior. The associated instance of the View object type 2e sends a detach-by-view event to the associated instance of the Agent object type 2d and transitions to the Detaching state 23c of the Processing state 22b. During the Detaching state 23c, the Transport Framework implementation 1c performs any steps required by the communications network implementation 1d to detach the application program 1a from the application program 1b and its associated instance of the Agent object type 2d.

Once the detach processing is complete and all sends and receives have also been completed, a remove-view event is sent to the associated instance of the Resource object type 2c and a detach-done event is triggered, transitioning the associated instance of the View object type 2e from the Processing state 22b of the Active state 21b to the Dormant state 21a, as shown in FIG. 21.

A detach-by-resource event is triggered from within the Transport Framework implementation 1c when an instance of the Resource object type 2c in the Waiting state 11d receives the detach-by-agent event. Receipt of the detach-by-resource event while the instance of the View object type 2e is in the Listening state 22a, also transitions the instance of the View object type 2e from the Listening state 22a of the Active state 21b to the Dormant state 21a.

Once the instance of the View object type 2e is in the Dormant state 21a, the only transition, as shown in FIG. 21, is to delete it. The delete is triggered from the instance of the Resource object type 2c after triggering the deactivate event or receiving the remove-view event.

Figure 23:
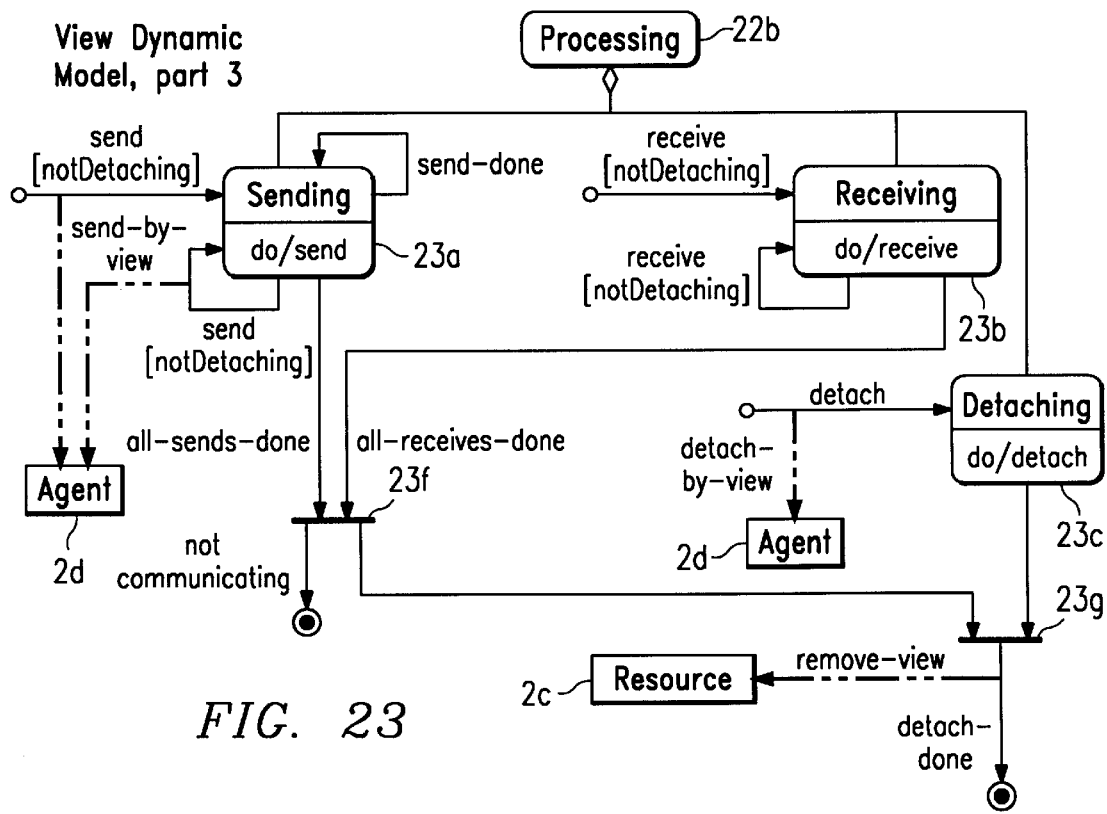
Figure 24:
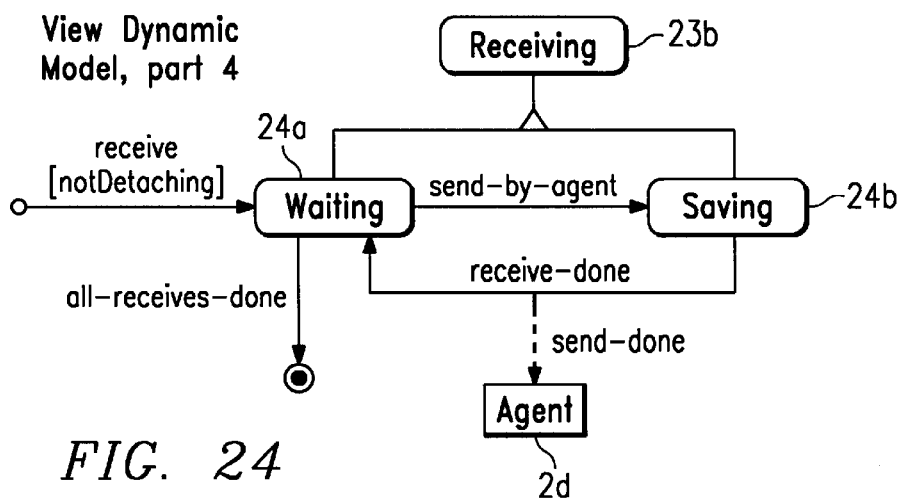

FIG. 23 illustrates in detail the Processing state 22b of the Active state 21b. The Sending state 23a, Receiving state 23b and Detaching state 23c can occur concurrently. The sync point at 23f indicates that both the all-sends-done event and the all-receives-done event must happen before transitioning out of the Processing state 23b. The sync point at 23g indicates that the all-sends-done, the all-receives-done and the completion of the processing by the Detaching state 23c can also transition the instance of the View object type 2e out of the Processing state 22b. Associated instances of the Agent object type 2d and associated instances of the Resource object type 2c are notified appropriately.

The behaviors associated with the Sending state 23a, the Receiving state 23b and the Detaching state 23c are provided by the particular implementation of the Transport Framework implementation 1c.

Data

Figure 25:
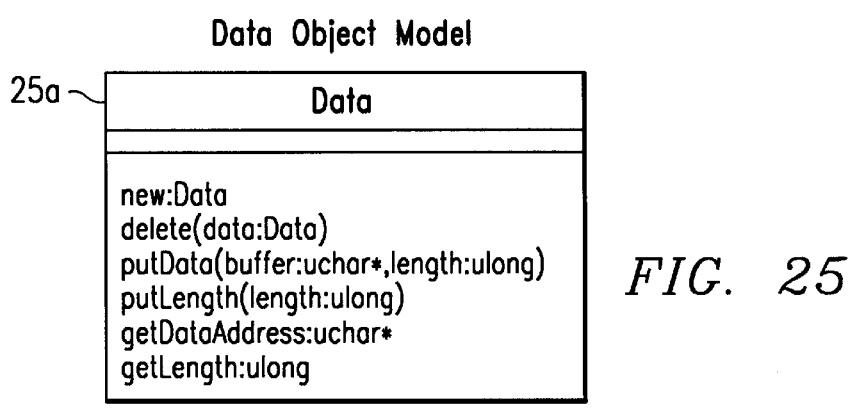
FIG. 25 shows an object model of the Data object of one embodiment of the present invention.

FIG. 25 shows an object model for the Data object type 2f. The Data object type 2f includes the behaviors putData( ), putLength( ), getDataAddress( ) and getLength( ). The behaviors putData and putLength place the data and the length of the data, respectively into the memory 1x of the general purpose digital computer. The behavior getLength( ) returns the length of the stored data from memory 1x. The behavior getDataAddress( ) returns the address in memory where the data starts. The data is thus stored contiguously in the computer memory 1x.

Figure 26:
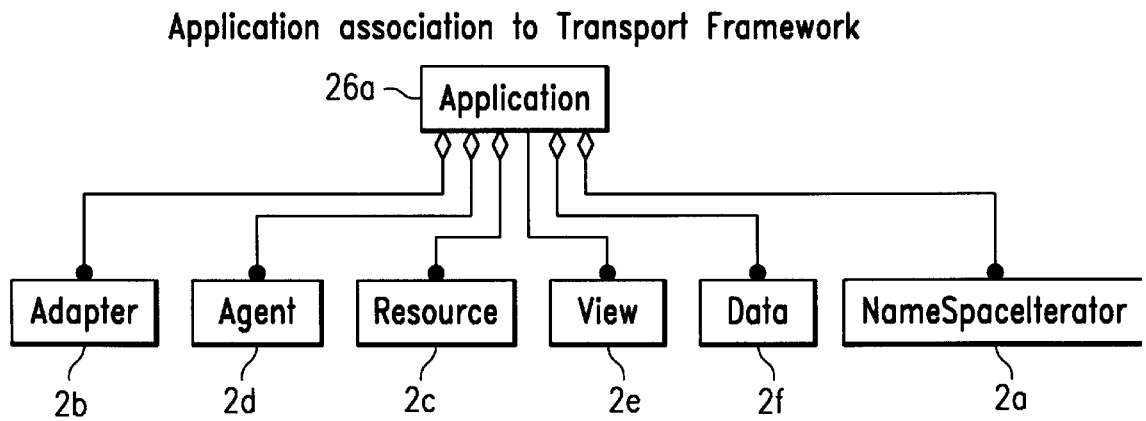
FIG. 26 illustrates one embodiment of an application using one embodiment of the present invention.

FIG. 26 illustrates an exemplary application program 26a and it's association with instances of the object types which comprise the Transport Framework of the present invention. The exemplary application program 26a creates and owns instances of the Adapter object type 2b, the Agent object type 2d, the Resource object type 2c, the Data object type 2f and the Name Space Iterator object type 2a. Instances of the View object type 2e, however, are created and owned by the Transport Framework implementations 1c. The application program 1a only references the instances of the View object type 2e when using them. The number of instances of the object types and which of the object types are instantiated depend upon the behavior the application program 1a desires from the Transport Framework implementation 1c.

Figure 27:
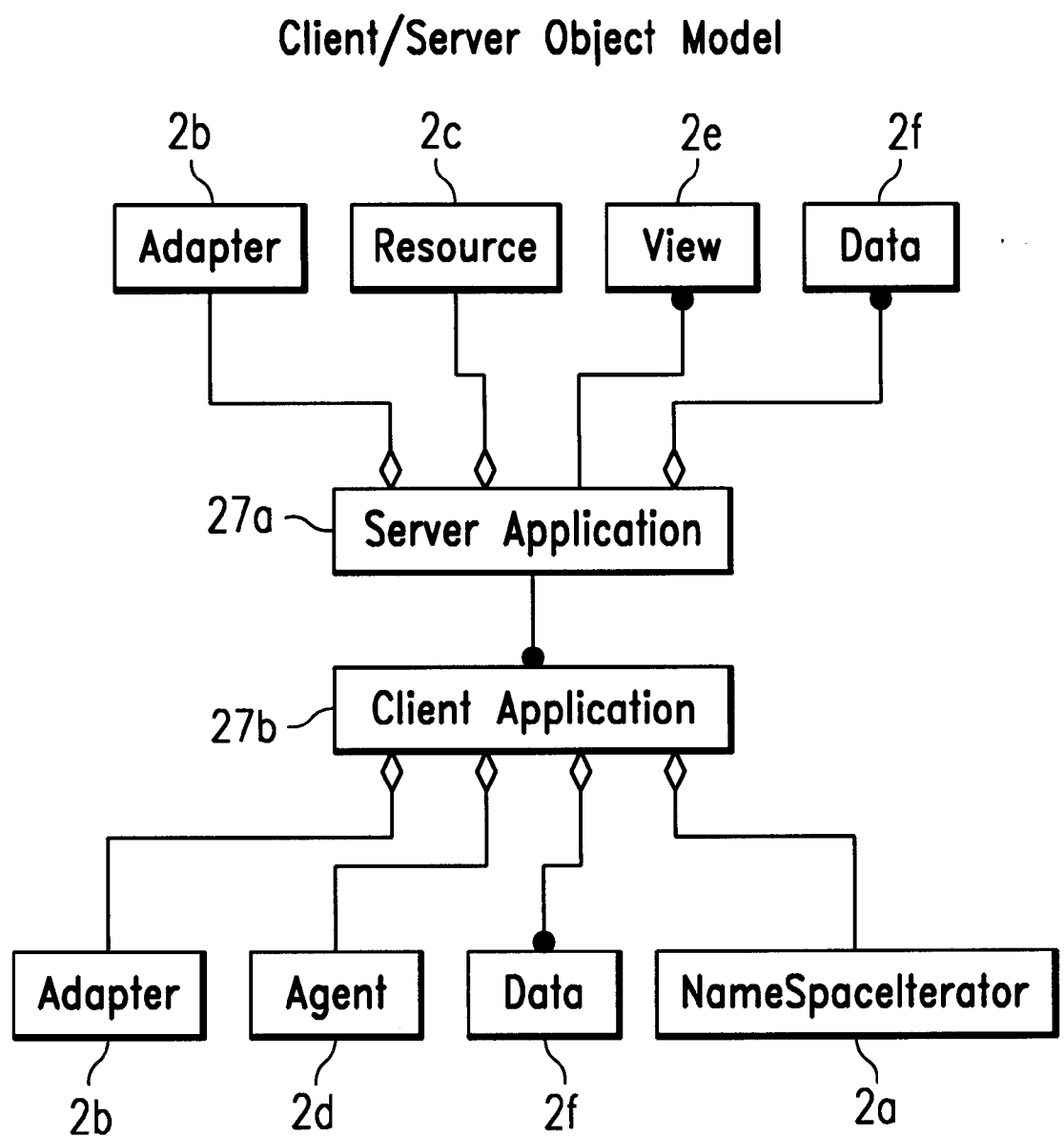
FIG. 27 depicts one embodiment of a client/server application using one embodiment of the present invention.

FIG. 27 illustrates an exemplary application of the Transport Framework implementation 1c of the present invention for a simple client-server protocol where the protocol in the server application 27a can handle multiple client applications 27b, but the client application 27b can only communicate with one server application 27a. The server application 27a thus creates one instance of the Adapter object type 2b, one instance of the Resource object type 2c. For each client application 27b that attaches to the server application 27a, one instance of the View object type 2e is also created. Instances of the Data object type 2f are created to hold the actual data transmitted.

The client application 27b creates one instance of the Adapter object type 2b, one instance of the Name Space Iterator object type 2a and one instance of the Agent object type 2d. One or more instances of the Data object type 2f are also created when communicating with the server application 27a through the Agent object type 2d to hold the actual data transmitted.

To simplify the exemplary client/server application shown in FIG. 27, the client application 27b does not need the Name Space Iterator object type 2a if the complete Resource Name for the instance of the Resource object type 2c associated with the server application 27a were available to the client application 27b.

Although the present invention has been described in detail, it should be understood that various changes, substitutions and alterations can be made thereto without departing from the spirit and scope of the present invention as defined by the appended claims.

What is claimed is:

1. A computer implemented system for facilitating communication between a plurality of programs, comprising a first adapter object associated with a first program, the first adapter object operable to associate the first program and a communications network interface;

a second adapter object associated with a second program, the second adapter object operable to associate the second program and the communications network interface;

a resource object associated with the first program, the resource object operable to generate a view object, the view object operable to communicate information to and receive information from the first program;

an agent object associated with the second program, the agent object operable to communicate information to and receive information from the second program, the agent object also operable to attach to the resource object, the resource object operable to generate the view object in response to the attachment of the agent object to the resource object; and the view object also operable to communicate information to and receive information from the agent object using the communications network interface, the view object and the agent object facilitating communication between the first and second programs.

2. The computer implemented system of claim 1, wherein the communications network interface comprises one of the following application program interfaces: Sockets, CPI-C, NetBEUI, WinSock, or PIPES Platform.

3. The computer implemented system of claim 1, wherein the view object is operable to communicate information to and receive information from the agent object using at least one data object, the data object operable to store the information communicated between the view object and the agent object.

4. The computer implemented system of claim 1, wherein the resource object is further operable to store at least one identifier associated with the first program in a memory;

further comprising a name space iterator object associated with the second program, the name space iterator object operable to search the memory for the at least one identifier associated with the first program; and wherein the agent object is operable to attach to the resource object using the at least one identifier associated with the first program.

5. The computer implemented system of claim 1, wherein the agent object comprises a first agent object and the view object comprises a first view object;

further comprising a second agent object associated with a third program, the second agent object operable to communicate information to and receive information from the third program, the second agent object also operable to attach to the resource object; and wherein the resource object is further operable to generate a second view object in response to the attachment of the second agent object to the resource object, the second view object operable to communicate information to and receive information from the second agent object through the communications network interface.

6. The computer implemented system of claim 1, wherein the adapter object is further operable to:

store information identifying one or more agent objects associated with the first program using a first data structure; and store information identifying one or more resource objects associated with the first program using a second data structure.

7. The computer implemented system of claim 1, wherein the resource object is further operable to store information identifying one or more view objects associated with the first program using a data structure.

8. A computer implemented system for facilitating communication between a plurality of programs, comprising a first adapter object associated with a first program, the first adapter object operable to associate the first program and a first communications network interface;

a second adapter object associated with a second program, the second adapter object operable to associate the second program and a second communications network interface, the first and second communications network interfaces using a common communications protocol;

a resource object associated with the first program, the resource object operable to generate a view object, the view object operable to communicate information to and receive information from the first program;

an agent object associated with the second program, the agent object operable to communicate information to and receive information from the second program, the agent object also operable to attach to the resource object, the resource object operable to generate the view object in response to the attachment of the agent object to the resource object; and the view object also operable to communicate information to and receive information from the agent object through the first and second communications network interfaces, the view object and the agent object facilitating communication between the first and second programs.

9. The computer implemented system of claim 8, wherein the first and second communications network interfaces each comprises one of the following application program interfaces: Sockets, CPI-C, NetBEUI, WinSock, or PIPES Platform.

10. The computer implemented system of claim 8, wherein the agent object comprises a first agent object and the view object comprises a first view object;

further comprising:

a third adapter object associated with a third program, the third adapter object operable to associate the third program and a third communications network interface, the first and third communications network interfaces using a common communications protocol; and a second agent object associated with the third program, the second agent object operable to communicate information to and receive information from the third program, the second agent object also operable to attach to the resource object; and wherein the resource object is further operable to generate a second view object in response to the attachment of the second agent object to the resource object, the second view object operable to communicate information to and receive information from the second agent object through the first and third communications network interfaces.

11. The computer implemented system of claim 8, wherein the resource object is further operable to store at least one identifier associated with the first program in a memory;

further comprising a name space iterator object associated with the second program, the name space iterator object operable to search the memory for the at least one identifier associated with the first program; and wherein the agent object is operable to attach to the resource object using the at least one identifier associated with the first program.

12. A computer implemented system for facilitating communication between a plurality of programs, comprising a first adapter object associated with a first program, the first adapter object operable to associate the first program and a communications network interface;

a resource object associated with the first program, the resource object operable to generate a view object in response to an agent object attaching to the resource object, the agent object associated with a second program, the second program associated with a communications network interface by a second adapter object, the agent object operable to communicate information to and receive information from the second program; and the view object operable to communicate information to and receive information from the first program, the view object also operable to communicate information to and receive information from the agent object using the communications network interface, the view object and the agent object facilitating communication between the first and second programs.

13. The computer implemented system of claim 12, wherein the communications network interface comprises one of the following application program interfaces: Sockets, CPI-C, NetBEUI, WinSock, or PIPES Platform.

14. A computer implemented system for facilitating communication between a plurality of programs, comprising an adapter object associated with a first program, the adapter object operable to associate the first program and a communications network interface;

an agent object associated with the first program, the agent object operable to communicate information to and receive information from the first program;

the agent object also operable to attach to a resource object associated with a second program, where the resource object is operable to generate a view object in response to the attachment of the agent object, the view object operable to communicate information to and receive information from the second program; and the agent object further operable to communicate information to and receive information from the view object using the communications network interface, the agent object and the view object facilitating communication between the first and second programs.

15. The computer implemented system of claim 14, wherein the communications network interface comprises one of the following application program interfaces: Sockets, CPI-C, NetBEUI, WinSock, or PIPES Platform.

16. A computer implemented method for facilitating communication between a plurality of programs, comprising:

initializing a first program to communicate using a first communications network interface;

initializing a second program to communicate using the first communications network interface or a second communications network interface;

generating a resource object associated with the first program, the resource object operable to generate a view object;

generating an agent object associated with the second program, the agent object operable to communicate information to and receive information from the second program;

attaching the agent object to the resource object; and generating the view object, the view object operable to communicate information to and receive information from the first program, the view object also operable to communicate information to and receive information from the agent object through the one or more communications network interfaces, the view object and the agent object facilitating communication between the first and second programs.

17. The computer implemented method of claim 16, wherein the one or more communications network interfaces each comprises one of the following application program interfaces: Sockets, CPI-C, NetBEUI, WinSock, or PIPES Platform.

18. The computer implemented method of claim 16, further comprising generating at least one data object operable to store the information communicated between the view object and the agent object.

19. The computer implemented method of claim 16, further comprising:

storing at least one identifier associated with the first program in a memory; and generating a name space iterator object associated with the second program, the name space iterator object operable to search the memory for the at least one identifier associated with the first program; and wherein attaching the agent object to the resource object comprises attaching the agent object to the resource object using the at least one identifier located by the name space iterator.

20. The computer implemented method of claim 16, wherein generating the agent object comprises generating a first agent object and generating the view object comprises generating a first view object; and further comprising:

generating a second agent object associated with a third program, the second agent object operable to communicate information to and receive information from the third program;

attaching the second agent object to the resource object; and generating a second view object, the second view object operable to communicate information to and receive information from the second agent object through the one or more communications network interfaces.

* * * * *